United States Patent
Klar et al.

(10) Patent No.: US 11,747,459 B2
(45) Date of Patent: Sep. 5, 2023

(54) RADAR SENSOR SYSTEM

(71) Applicant: Robert Bosch GmbH, Stuttgart (DE)

(72) Inventors: Michael Klar, Magstadt (DE); Michael Schoor, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 191 days.

(21) Appl. No.: 16/976,852

(22) PCT Filed: Mar. 14, 2019

(86) PCT No.: PCT/EP2019/056387
§ 371 (c)(1),
(2) Date: Aug. 31, 2020

(87) PCT Pub. No.: WO2019/233645
PCT Pub. Date: Dec. 12, 2019

(65) Prior Publication Data
US 2020/0408890 A1    Dec. 31, 2020

(30) Foreign Application Priority Data

Jun. 7, 2018   (DE) .......................... 102018208992.2

(51) Int. Cl.
*G01S 13/931*     (2020.01)
*G01S 13/34*      (2006.01)
(Continued)

(52) U.S. Cl.
CPC ............ *G01S 13/343* (2013.01); *G01S 7/023* (2013.01); *G01S 7/0232* (2021.05);
(Continued)

(58) Field of Classification Search
CPC .... G01S 13/003; G01S 13/343; G01S 13/878; G01S 13/931; G01S 2013/9314;
(Continued)

(56) References Cited

U.S. PATENT DOCUMENTS 3,798,374 A * 3/1974 Meyers ................. H04R 3/002
                                                    381/103
2005/0083225 A1   4/2005 Braubach et al.
(Continued)

FOREIGN PATENT DOCUMENTS

DE    102014212280 A1   12/2015
DE    102014212284 A1   12/2015
(Continued)

OTHER PUBLICATIONS

International Search Report for PCT/EP2019/056387, dated Jun. 19, 2019.

*Primary Examiner* — Timothy A Brainard
(74) *Attorney, Agent, or Firm* — NORTON ROSE FULBRIGHT US LLP; Gerard Messina

(57) ABSTRACT

A radar sensor system is provided. The radar sensor system includes: at least two radar sensors each having at least one transmitter and at least one receiver, detection regions of the two radar sensors overlapping at least partially. The two radar sensors are situated at a defined distance from one another. Transmit signals of the two radar sensors are synchronizable in such a way that radiation of one radar sensor that was emitted by the respective other radar sensor and reflected by an object is capable of being evaluated by an evaluation device.

10 Claims, 1 Drawing Sheet

(51) Int. Cl.
*G01S 13/00* (2006.01)
*G01S 7/02* (2006.01)

(52) U.S. Cl.
CPC .......... *G01S 7/0235* (2021.05); *G01S 13/003* (2013.01); *G01S 13/931* (2013.01); *G01S 2013/9314* (2013.01)

(58) Field of Classification Search
CPC . G01S 2013/93271; G01S 2013/93272; G01S 7/023; G01S 7/0232; G01S 7/0235
See application file for complete search history.

(56) References Cited

U.S. PATENT DOCUMENTS

| | | | |
|---|---|---|---|
| 2008/0100500 A1* | 5/2008 | Kondoh | G01S 7/0232 342/109 |
| 2010/0259439 A1 | 10/2010 | Brandao et al. | |
| 2012/0200446 A1* | 8/2012 | Shirakawa | G01S 7/40 342/27 |
| 2013/0162461 A1* | 6/2013 | Lucking | G01S 13/931 367/99 |
| 2015/0276918 A1* | 10/2015 | Ramasubramanian | G01S 13/584 342/107 |
| 2017/0212214 A1* | 7/2017 | Murali | G01S 13/931 |
| 2018/0113206 A1 | 4/2018 | Pokrass et al. | |
| 2018/0348340 A1* | 12/2018 | Lien | G01S 7/034 |
| 2019/0044606 A1* | 2/2019 | Mansikkamäki | H04B 7/15507 |

FOREIGN PATENT DOCUMENTS

| | | |
|---|---|---|
| DE | 102015218542 A1 | 3/2017 |
| DE | 102015224787 A1 | 6/2017 |
| JP | 2003344531 A | 12/2003 |
| JP | 2004526976 A | 9/2004 |
| JP | 2016138787 A | 8/2016 |
| JP | 2016161409 A | 9/2016 |
| JP | 2018059895 A | 4/2018 |
| WO | 0107930 A1 | 2/2001 |

* cited by examiner

RADAR SENSOR SYSTEM

FIELD

The present invention relates to a radar sensor system. In addition, the present invention relates to a method for producing a radar sensor system. In addition, the present invention relates to a method for operating a radar sensor system. In addition, the present invention relates to a computer program product.

BACKGROUND INFORMATION

Increasing numbers of radar sensors are being installed in vehicles that have a high level of driver assistance functions or automated driving function. A higher number of radar sensors is intended to achieve a higher degree of performance of the automated or partly automated driving functions in comparison with individual radar sensors. Previous solutions in this area have been realized by radar sensors that carry out, internal to the sensor, extensive data processing of the received radar waves. In this way, the radar sensors can supply data at the object level or location level for further evaluation by the vehicle. As a result, the quantity of data transmitted to the vehicle can be reduced, but the respective radar sensors must have a higher degree of computing power and a larger memory.

However, parking functions in particular are impaired by properties of wave propagation; for example, walls reflect strongly and thereby mask objects that reflect more weakly, such as posts.

Bistatic evaluations in connection with ultrasound are conventional. Here, run time differences of acoustic and electric signals are evaluated.

German Patent Application No. DE 10 2014 212 280 A1 describes a method for determining a relative speed of a radar target in which an FMCW radar measurement is carried out with a transmission signal whose modulation pattern includes sequences that are temporally interleaved (JSFMCW modulation method).

German Patent Application No. DE 10 2014 212 284 A1 described an MIMO FMCW radar sensor and an MIMO time-division multiplexing method for locating a radar target in which an FMCW radar measurement is carried out with a transmit signal whose modulation pattern includes temporally interleaved sequences of ramps for different transmit switching states that differ in the selection of the antenna elements used for the transmission.

SUMMARY

An object of the present invention is to provide an improved radar sensor system that supports an improved object classification.

This object may achieved by example embodiments of the present invention. Advantageous embodiments of the present invention are described herein.

According to a first aspect present invention, the object may be achieved by an example radar sensor system having: at least two radar sensors each having at least one transmitter and at least one receiver, detection regions of the two radar sensors overlapping at least partially, the two radar sensors being situated at a defined distance from one another, transmit signals of the two radar sensors being synchronizable in such a way that radiation of a radar sensor, emitted by the respective other radar sensor and reflected by an object, is capable of being evaluated by an evaluation device.

In this way, with the example radar sensor system of the present invention, objects can be classified in an improved manner. The radar sensor system in accordance with the present invention is particularly useful for applications in the near field, for example for parking applications of motor vehicles. Here the fact is exploited that objects are irradiated from a first direction, and signals are received from a different direction that are then evaluated and classified.

According to a second aspect of the present invention, the object may be achieved by an example method for producing a radar sensor system, having the steps:
providing at least two radar sensors, detection regions of the two radar sensors overlapping at least partially, the two radar sensors being situated at a defined distance from one another, transmit signals of the two radar sensors being synchronizable in such a way that radiation of a radar sensor, emitted by the respective other radar sensor and reflected by an object, is capable of being evaluated by an evaluation device.

According to a third aspect of the present invention, the object may be achieved by an example method for operating a radar sensor system, having the steps:
simultaneous transmission of radar signals of at least two radar sensors, detection regions of the two radar sensors overlapping at least partially and the two radar sensors being situated at a defined distance from one another,
transmit signals of the two radar sensors being synchronized in such a way that radiation of a radar sensor, emitted by the respective other radar sensor and reflected by an object, is evaluated by an evaluation device.

A preferred specific example embodiment of the radar sensor system in accordance with the present invention includes that that the at least two radar sensors transmit substantially at the same time, transmit substantially on the same frequency, and have substantially the same modulation parameters. In this way, a good synchronization of the transmitted signals is supported, thus enabling an accurate bistatic evaluation.

A further preferred specific example embodiment of the radar sensor system includes that the at least two radar sensors are capable of transmitting FMCW ramps that have substantially the same modulation parameters. In this way as well, a good synchronization of the transmit signals of the radar sensors is supported.

A further preferred example embodiment of the radar sensor system in accordance with the present invention includes that a frequency offset between the two radar sensors is capable of being determined and compensated in that the transmitters of the radar sensors transmit in alternating fashion, the receivers of the non-transmitting radar sensors simultaneously receiving. In this way, the frequency offset between the two radar sensors can advantageously be corrected due to the fact that the radar sensors each act in alternating fashion as transmitter and receiver.

A further preferred specific example embodiment of the radar sensor system of the present invention includes that the frequency offset between the two radar sensors is capable of being determined and compensated in that, for a target object, two baseband frequencies for two unknown objects are measured, and for N target objects, 2N baseband frequencies are measured for N+1 unknown objects. Advantageously, in this way the frequency offset between the radar sensors can be determined more accurately the larger the number of targets is.

A further preferred specific example embodiment of the radar sensor system in accordance with the present invention includes that for the synchronization of the FMCW ramps, a frequency offset between the two radar sensors can be determined and compensated. In this way, a further optimization of the synchronization of the transmit signals of the radar sensors is supported.

A further preferred specific example embodiment of the radar sensor system in accordance with the present invention includes that the two radar sensors are capable of transmitting temporally interleaved FMCW ramps. In this way, a good use case is provided for the application of the method for the JSFMCW modulation method.

A further preferred specific example embodiment of the radar sensor system in accordance with the present invention includes that a bistatic and a monostatic radar cross-section of the object can be ascertained by the evaluation device. In this way, as a function of the angle of incidence and angle of reflection, a good object recognition and classification can be carried out.

A further preferred specific example embodiment of the radar sensor system in accordance with the present invention includes that for the synchronization of the transmit signals of the radar sensors, signal power levels of the transmit signals can be taken into account in a defined manner. In this way, an optimization of the synchronization of the transmit signals of the radar sensors can advantageously be carried out.

In the following, preferred exemplary embodiments of the present invention are explained in more detail on the basis of highly simplified schematic representations.

DETAILED DESCRIPTION OF EXAMPLE EMBODIMENTS

Figures 1, 2:
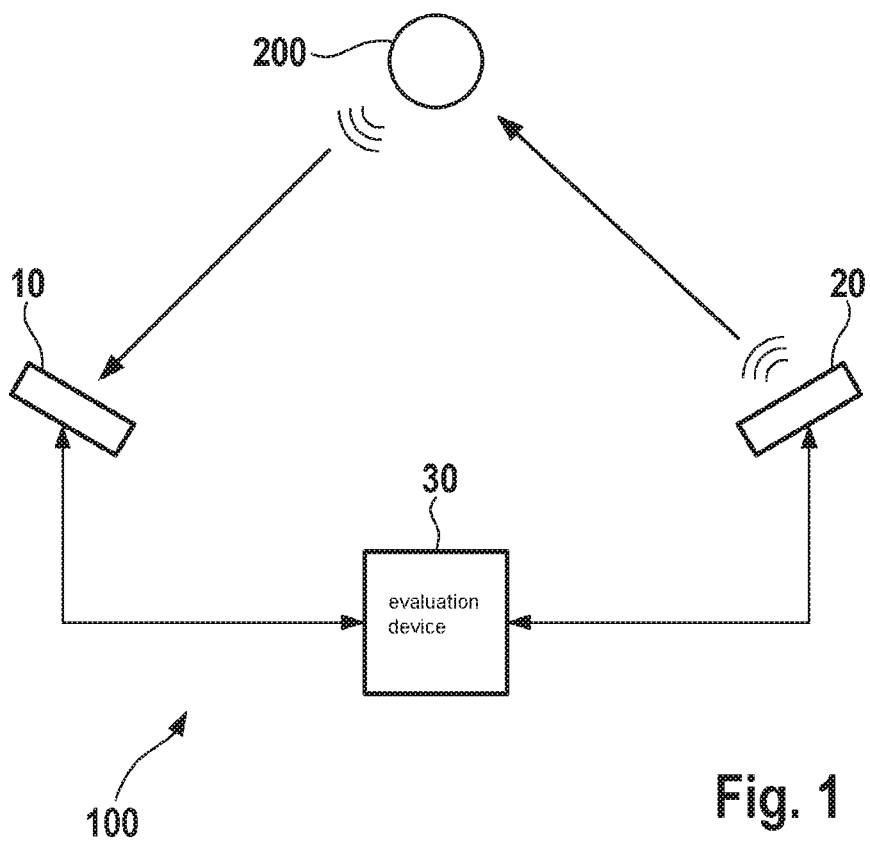
FIG. 1 shows a schematic representation of a radar sensor system in accordance with an example embodiment of the present invention.
FIG. 2 shows a schematic representation of a method for producing a radar sensor system in accordance with an example embodiment of the present invention.

Herein, a "bistatic evaluation" is understood as meaning that signals of a system made up of a transmitter and receiver are evaluated, where the transmitter and receiver are not situated at the same location, but rather at a distance from one another.

FIG. 1 shows a schematic representation of a radar sensor system 100 in accordance with an example embodiment of the present invention. Shown is a first radar sensor 10 and a second radar sensor 20, situated at a distance from first radar sensor 10, the radar sensors being functionally connected by an evaluation device 30. Thus, what is provided in accordance with an example embodiment of the present invention, is a composite of radar sensors 10, 20, in which one radar sensor 10, 20 can evaluate radar waves that are emitted by the respective other radar sensor 10, 20 and reflected by an object 200. FIG. 1 indicates that a transmit signal emitted by second radar sensor 20 is reflected by object 200, and the reflected signal is received by first radar sensor 10. The depicted number of two radar sensors 10, 20 is shown only as an example; radar sensor system 100 can also include more than two radar sensors 10, 20.

Through the above evaluation of the radiation emitted by another radar sensor, an ascertaining is enabled both of the monostatic and also of the bistatic back-scatter cross-section (radar cross-section, or RCS) of object 200, which is a measure of a reflectivity of object 200 and thus enables better recognition/detection and classification of objects, in particular for parking applications in a motor vehicle. Due to the closeness of objects 200, a large angular difference to radar sensors 10, 20 can be achieved.

In order to enable a bistatic evaluation, two or more radar sensors 10, 20 having transmitters and receivers are used, and their fields of view, or detection regions, overlap at least partially. In addition, radar sensors 10, 20 of radar sensor system 100 are synchronized up to a certain degree so that a receiver can appropriately evaluate the waves of another, "foreign" transmitter.

The synchronization is based substantially on a synchronization of the reference oscillators (not shown) of radar sensors 10, 20. Each radar sensor 10, 20 has a quartz oscillator, and via a communication interface (e.g., Ethernet; not shown), the deviation from a reference frequency is determined regularly via timestamps. Here, Ethernet has the advantage that, with PTP (Precision Time Protocol), it provides a corresponding standard that, with hardware support, enables a time synchronization in the region of 10 ns.

In this way, it is possible to synchronize the receiving of one radar sensor 10, 20 with the transmitting of the other radar sensor 10, 20, so that a transmit signal of the other radar sensor 10, 20 is also received. For example, with the use of FMCW ramps as transmit signals, given a rise of 5 MHz/ps a frequency offset of 50 kHz results, which lies well within the baseband of, typically, approximately 5 MHz. This frequency offset is a frequency error that results in a distance error, for which reason it is sought to keep the frequency errors as small as possible.

Via the synchronization of the transmit signals of the two radar sensors 10, 20, it is possible to synchronize the center frequency and the rise of the respective locally produced oscillator frequency. If an accuracy of 1 ppm is achieved, this results in a frequency offset of approximately 76 kHz. In sum, the frequency offset is always well within the base bandwidth, and as a result the main demand made on the synchronization is met, and as a result the error is small enough that the bistatic signals do not depart from the evaluation region. It is sought to keep the synchronization error as small as possible in order in this way to optimize the estimation of the distance.

For this purpose, the occurrent frequency offset has to be compensated, because this can falsify the distance estimation. For the baseband frequency $f_{bb}$, the following holds:

$$f_{bb} = f_{TX}(t - \tau - T_{TX\text{-}RX}) - f_{RX}(t) \tag{1}$$

where:

τ: signal runtime
$T_{TX\text{-}RX}$: time offset between transmitter and receiver (positive if the transmitter starts before the receiver)

$$\tau = \frac{d_{TX,RX}}{c} \tag{2}$$

$d_{TX,RX}$: overall path from the transmitter to the receiver c: propagation speed $$f_{TX}(t) = f_{s,TX} + s \cdot t$$

$$f_{RX}(t) = f_{s,RX} + s \cdot t \tag{3}$$

s: ramp rise of the FMCW ramps
$f_s$: start frequency
t: time

When applied, this yields:

$$f_{bb} = f_{TX}(t - \tau - T_{TX-RX}) - f_{RX}(t) = \quad (4)$$
$$f_{s,TX} + s \cdot (t - \tau - T_{TX-RX}) - f_{s,RX} - s \cdot t =$$
$$(f_{s,TX} - f_{s,RX}) - s \cdot (\tau + T_{TX-RX}) =$$
$$\frac{-s}{c} \cdot d_{TX,RX} + (f_{s,TX} - f_{s,RX}) - s \cdot T_{TX-RX} = \frac{-s}{c} \cdot d_{TX,RX} + \Delta f$$

$\Delta f$: frequency offset
$f_{s,Tx} - f_{s,Rx}$: difference in the start frequencies The received baseband frequency is also a function of the offset of the oscillator frequencies and the time error.

The equations (1) through (4) thus specify that baseband frequency $f_{bb}$ is a function of the ramp signals and the run times, and the frequency offset $\Delta f$ also has to be taken into account.

This error in the form of frequency offset $\Delta f$ is corrected by cycling through the transmitter and receiver; i.e., the transmitter is alternately assigned to first radar sensor 10 and to second radar sensor 20, whereby the two radar sensors 10, 20 act in alternating fashion as transmitter. This cycling through of transmitter and receiver is well-suited for combination with the above-named conventional JSFMCW modulation method, in which, in an interleaving in time-division multiplexing, not only transmitters of the home radar sensor but also transmitters of foreign radar sensors occupy a ramp.

In a scenario of a radar sensor system 100 having two radar sensors 10, 20, the above general equation (4) has to be modified as follows:

$$f_{bb,12} = \frac{-s}{c} \cdot d_{TX,RX} + (f_{s,2} - f_{s,2}) - s \cdot T_{1-2} = \frac{-s}{c} \cdot d_{TX,RX} + \Delta f \quad (5)$$
$$f_{bb,21} = \frac{-s}{c} \cdot d_{TX,RX} + (f_{s,2} - f_{s,1}) - s \cdot T_{2-1} = \frac{-s}{c} \cdot d_{TX,RX} - \Delta f$$

where
$f_{bb,12}$: baseband frequency: sensor 1 transmits, sensor 2 receives
$f_{bb,21}$: baseband frequency: sensor 2 transmits, sensor 1 receives
$f_{s,1}$: sensor 1 start frequency
$f_{s,2}$: sensor 2 start frequency
$T_{1-2}$: time offset between sensor 1 and sensor 2, sensor 1 transmitting.

Here, due to symmetry the following holds:

$$(f_{s,1} - f_{s,2}) = -(f_{s,2} - f_{s,1})$$

$$T_{1-2} = T_{2-1} \quad (6)$$

where
$T_{2-1}$: time offset between sensor 2 and sensor 1, sensor 2 transmitting.

In the bistatic evaluation, all baseband frequencies are thus shifted by the offset, whose sign changes as the wave propagation is reversed, i.e., when the transmitter and receiver are interchanged.

For a target object 200, two baseband frequencies are thus measured for two unknown objects; for N targets, this is 2N baseband frequencies for N+1 unknown objects. That is, the true frequency is measured once and the frequency offset, or frequency error, is measured once. When there are more target objects, the number of baseband frequencies increases correspondingly, but the number of unknown objects advantageously does not increase to the same extent.

This mathematical problem is solvable in principle; due to the shift, a type of correlation or least squares approach is preferred for the solution.

For the optimization of the computing outlay for solving the mathematical problem, it is possible to include signal power levels of the transmit signals, and for example to use only signals having high power, or similar power, in order to determine the offset at least roughly.

Using the synchronization measures described above, a receiver can receive signals from a different transmitter, thus enabling a bistatic evaluation.

Advantageously, an alternating operation of the radar sensors takes place at temporally short intervals, because in this way a synchronization error, in the form of the frequency offset, which can also change, is compensated. For example, this is possible in that one radar sensor heats up somewhat differently than does the other radar sensor, and/or that the radar sensors have different drifts. In addition, in this way changing driving situations can be taken into account, whereby it is supported that, in the bistatic evaluation, measurements of the radar sensors have a relevance to one another.

Using the bistatic evaluation in accordance with the present invention, it is possible to recognize objects that are not recognizable without the method of the present invention. In addition, a classification of the recognized objects can be improved with the provided bistatic evaluation.

The provided approach is limited by the phase noise that is uncorrelated when there are two independent oscillators of the two sensors, and which can therefore cause high noise levels. For a bistatic evaluation, a practical application is therefore provided in particular for the near field (e.g., parking applications), to the extent that no technology having low phase noise is available.

An improvement results if, in addition, a reference frequency is also transmitted via a communication interface (or separately via a vehicle bus based on the EMV shielding), so that the local oscillators and their PLLs use a coherent reference so that the phase noise within the PLL loop bandwidth is at least somewhat correlated, whereby the phase noise in the bistatic evaluation can also be at least slightly suppressed for a defined frequency range.

Radar sensor system 200 can for example be realized as an FMCW radar unit, e.g., an FMCW chirp sequence radar unit, but can also be operated with other types of modulation.

The radar sensor system 100 in accordance with the present invention can advantageously be realized not only with full radar sensors, but also with radar sensor heads, a central control device being provided for processing the signals of the radar sensor heads.

The design, in accordance with the present invention, having e.g., five radar sensors may possibly be used in a vehicle, where the radar sensors are situated on the vehicle at the front left, front right, and front center, as well as at the rear left and rear right. The front three radar sensors have partially overlapping fields of view. If applicable, the named radar sensors can be supplemented by further satellite sensors in order to optimize the example method.

Advantageously, the example method for operating a radar sensor system 100 in accordance with the present invention can be realized as software that runs on radar sensor system 100. In this way, an easy adaptability of the method is advantageously supported.

FIG. 2 shows a sequence of a method for producing a radar sensor system 100.

In a step 300, at least two radar sensors 10, 20 are provided, detection regions of the two radar sensors 10, 20 overlapping at least partially, the two radar sensors 10, 20 being situated at a defined distance from one another, transmit signals of the two radar sensors 10, 20 being synchronizable in such a way that radiation of one radar sensor 10, 20, emitted by the respective other radar sensor 10, 20 and reflected by an object 200, is capable of being evaluated by an evaluation device 30.

In sum, the radar sensor system in accordance with the example embodiment of the present invention enables a bistatic evaluation, with a small outlay, for the synchronization of the oscillators in the sensors. As a result, it is possible to carry out a bistatic evaluation at low cost. For example, it is possible to activate the bistatic evaluation operation of the radar sensor system in an application-specific fashion.

What is claimed is:

1. A radar sensor system, comprising:
   an evaluation device; and
   at least two radar sensors, each of the at least two radar sensors having at least one transmitter and at least one receiver, wherein:
     detection regions of the at least two radar sensors overlap at least partially, the at least two radar sensors being situated at a defined distance from one another; and
     the radar sensor system is configured to perform a detection in a manner that compensates for a frequency offset between a first of the at least two radar sensors and a second of the at least two radar sensors by an operation that includes:
       operating the first and second radar sensors alternatingly, cycling, by switching after each passage of a predefined interval, between (a) a first state in which the first radar sensor functions as a signal transmitter and not as a signal receiver and the second radar sensor functions as the signal receiver and not as the signal transmitter and (b) a second state in which the second radar sensor functions as the signal transmitter and not as the signal receiver and the second radar sensor functions as the signal receiver and not as the signal transmitter; and
       detecting an object, using the evaluation device, based on a combination of signals received in both of the first and second states achieved by the cycling.

2. The radar sensor system as recited in claim 1, wherein the first and second radar sensors have substantially the same modulation parameters.

3. The radar sensor system as recited in claim 2, wherein the at least two radar sensors are configured to transmit FMCW ramps that have substantially the same modulation parameters.

4. The radar sensor system as recited in claim 3, wherein the cycling includes the first and second radar sensors transmitting temporally interleaved FMCW ramps.

5. The radar sensor system as recited in claim 1, wherein the evaluation device is configured to ascertain a bistatic and a monostatic radar cross-section of the object.

6. The radar sensor system as recited in claim 1, wherein for synchronization of the radar sensors, signal power levels of transmit signals are taken into account in a defined manner.

7. The radar sensor system as recited in claim 1, wherein the detecting of the object includes using the combination of signals to determine a value of the frequency offset, and performing a correction based on the determined value of the frequency offset.

8. A method for producing a radar sensor system, comprising:
   providing an evaluation device and at least two radar sensors, wherein:
     detection regions of the at least two radar sensors overlap at least partially, the at least two radar sensors being situated at a defined distance from one another; and
     the radar sensor system is configured to perform a detection in a manner that compensates for a frequency offset between a first of the at least two radar sensors and a second of the at least two radar sensors by an operation that includes:
       operating the first and second radar sensors alternatingly, cycling, by switching after each passage of a predefined interval, between (a) a first state in which the first radar sensor functions as a signal transmitter and not as a signal receiver and the second radar sensor functions as the signal receiver and not as the signal transmitter and (b) a second state in which the second radar sensor functions as the signal transmitter and not as the signal receiver and the second radar sensor functions as the signal receiver and not as the signal transmitter; and
       detecting an object, using the evaluation device, based on a combination of signals received in both of the first and second states achieved by the cycling.

9. A method for operating a radar sensor system that includes at least two radar sensors, detection regions of the at least two radar sensors overlapping at least partially and the at least two radar sensors being situated at a defined distance from one another, the method comprising:
   performing a detection in a manner that compensates for a frequency offset between a first of the at least two radar sensors and a second of the at least two radar sensors by an operation that includes:
     operating the first and second radar sensors alternatingly, cycling, by switching after each passage of a predefined interval, between (a) a first state in which the first radar sensor functions as a signal transmitter and not as a signal receiver and the second radar sensor functions as the signal receiver and not as the signal transmitter and (b) a second state in which the second radar sensor functions as the signal transmitter and not as the signal receiver and the second radar sensor functions as the signal receiver and not as the signal transmitter; and
     detecting an object, by an evaluation device, based on a combination of signals received in both of the first and second states achieved by the cycling.

10. A non-transitory computer-readable medium on which is stored a computer program having program code that is executable by a computer and that, when executed by the computer, causes the computer to perform a method for operating a radar sensor system, the radar sensor system including at least two radar sensors, detection regions of the at least two radar sensors overlapping at least partially and the at least two radar sensors being situated at a defined distance from one another, the method comprising:

performing a detection in a manner that compensates for a frequency offset between a first of the at least two radar sensors and a second of the at least two radar sensors by an operation that includes:
  operating the first and second radar sensors alternatingly, cycling, by switching after each passage of a predefined interval, between (a) a first state in which the first radar sensor functions as a signal transmitter and not as a signal receiver and the second radar sensor functions as the signal receiver and not as the signal transmitter and (b) a second state in which the second radar sensor functions as the signal transmitter and not as the signal receiver and the second radar sensor functions as the signal receiver and not as the signal transmitter; and
  detecting an object, by an evaluation device, based on a combination of signals received in both of the first and second states achieved by the cycling.

\* \* \* \* \*